(12) United States Patent
Watkins (10) Patent No.: US 6,182,920 B1
(45) Date of Patent: Feb. 6, 2001

(54) COLLAPSIBLE CABLE DISPENSING DOLLY

(76) Inventor: David G. Watkins, 15917-1/2 Maxine La., Houston, TX (US) 77068

( * ) Notice: Under 35 U.S.C. 154(b), the term of this patent shall be extended for 0 days.

(21) Appl. No.: 08/689,363

(22) Filed: Aug. 8, 1996

(51) Int. Cl.$^7$ ............................. B65H 16/02; B65H 16/04
(52) U.S. Cl. ..................................... 242/594.4; 242/594.6; 242/597.8
(58) Field of Search .................................. 242/557, 588, 242/594.3, 594.4, 594.5, 594.6, 129.5, 597, 597.8; 414/911

(56) References Cited

U.S. PATENT DOCUMENTS

| | | | |
|---|---|---|---|
| 479,571 | * 7/1892 | Pratt | 242/594.6 |
| 1,509,717 | 9/1924 | Davis . | |
| 2,155,769 | 4/1939 | Porter | 242/90 |
| 2,463,192 | 3/1949 | Mackey et al. | 242/111 |
| 2,775,357 | * 12/1956 | De Arment | 414/911 |
| 3,764,031 | 10/1973 | Parsen | 214/506 |
| 3,920,194 | 11/1975 | Parsen | 242/85 |
| 4,172,608 | * 10/1979 | Brown, Jr. | 242/588 |
| 4,457,527 | * 7/1984 | Lowery | 242/594.4 |
| 4,611,645 | * 9/1986 | Whisnant | 242/557 X |
| 4,746,078 | 5/1988 | Setzke | 242/94 |
| 5,499,727 | 3/1996 | Koch | 211/193 |

OTHER PUBLICATIONS

Cabling Business Products sheet; (p. 72); Apr. 1996.
"Piggy Back" Wire Dispensers: (2 pages) (undated).
Hawk Industry Products; H.I.P.; New Items (undated) (1 two–sided card).
Hawk Industry Products; H.I.P.; brochure; Electrical Wire Caddies (undated).
Hawk Industry Products; H.I.P.; (1 sheet of caddies) (undated).

* cited by examiner

*Primary Examiner*—John Q. Nguyen
(74) *Attorney, Agent, or Firm*—Conley, Rose &Tayon (57) ABSTRACT

A portable, collapsible dolly for dispensing cable from spools. The present dolly includes a frame body having first and second ends, a substantially vertical support having upper and lower ends and an inclined support having first and second ends, with at least one of the supports including a spool axle. According to a preferred embodiment, the lower end of the vertical support is releasably pivotally affixed to the first end of the body, the first end of the inclined support is releasably affixed to the upper end of the vertical support and the second end of the inclined support is releasably pivotally affixed to the second end of the body. The apparatus also includes an optional handle releasably pivotally affixed to the second end of the body and interchangeable with an extendible elevating cable boom.

24 Claims, 7 Drawing Sheets

COLLAPSIBLE CABLE DISPENSING DOLLY

TECHNICAL FIELD OF THE INVENTION

The present invention relates to the field of dollies or hand trucks for carrying equipment. More particularly, the present invention relates to a dolly specially adapted for carrying and dispensing cable. Still more particularly, the present invention comprises a collapsible dolly adapted to support and dispense electrical or communications cable from four or more spools simultaneously.

BACKGROUND OF THE INVENTION

At the present time, cables of various sorts are used to connect the many pieces of digital and/or communications equipment that may be used in offices, control rooms and the like. When the equipment is installed, or if it is reconfigured later, it is necessary to run hundreds, even thousands, of feet of such cable. The cable is typically provided on spools and is unwound, or dispensed, from these spools as needed. Because of the weight and bulk of the cable, most conventional cable-pulling operations use 1000-foot spools, which weigh approximately 30 pounds each. Because normal cable usage typically results in a scrap of cable at the end of the spool that is too short to use cost-effectively, these scraps are considered waste. Research has revealed the length of the average scrap to be approximately 100 feet, or ten percent of a 1000 foot spool. The scrap length is independent of the volume of cable originally on the spool, so the use of larger capacity spools would result in a correspondingly lower percentage of scrapped cable. It is therefore desired to provide a means for dispensing cable that allows use of larger capacity spools.

In addition, currently available devices for supporting the cable spool(s) during usage do not typically provide for the simultaneous dispensing of cable from multiple spools. At present, make-shift cable dispensing devices may even include one or more lengths of pipe inserted through the rungs of a step ladder to form a crude axle for each spool. More commonly, the spools supplying the cable are positioned at the installation site on their ends so that they do not roll as the cable is unwound. The cable installer has to make sure that the cables do not become tangled or kinked as they unwind.

Other devices exist that are capable of supporting multiple spools, but these are not collapsible and tend to be expensive. Devices that are not collapsible are disadvantageous because they require use of freight or service entrances and elevators. In a large office building the installation crew may spend a significant amount of time waiting for the freight elevator to become available before the equipment can be brought to the installation site. Such downtime adds to the expense of the installation. Hence, it is desired to provide a collapsible cable dispensing dolly that is simple to use and inexpensive to manufacture. It is further desired that the dolly be capable of transporting and dispensing cable from as many as eight spools simultaneously.

SUMMARY OF THE INVENTION

The present cable dolly is a portable, folding, communications or electrical cable dispensing device designed to carry eight 3,000' capacity, 14" diameter spools with the ability to dispense the cable either straight through a wire manager or up through a ceiling boom. The boom is an attachment to the collapsible base dolly which facilitates cable management into high ceilings or cable trays. All pieces of the boom are releasably attached via pins. The cable dolly can be unloaded and folded down from a standing height of 47 inches to a low profile height of 10.5 inches. In the folded position the diagonal support folds down to become the handle for transportation, allowing one man to transport the cable dolly with one hand.

BRIEF DESCRIPTION OF THE DRAWINGS

For a more detailed description of the present invention, reference will now be made to the accompanying Figures, wherein.

DETAILED DESCRIPTION OF THE PREFERRED EMBODIMENTS

Figure 1:
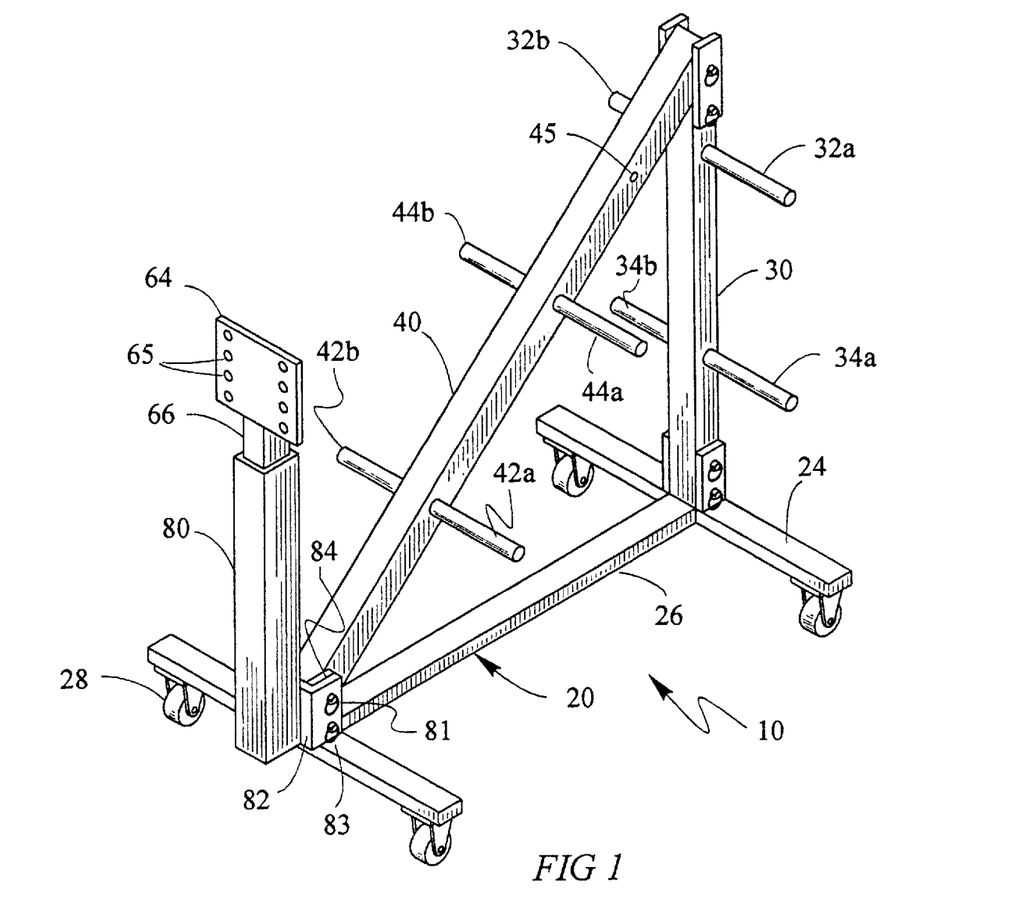
FIG. 1 is a perspective view of the present dolly in its assembled and expanded state and with its handle in place.

Referring initially to FIG. 1, the present dolly 10 includes, an I-shaped frame base 20, an upright support 30, an inclined support 40 and a handle 80. Base 20 comprises a front crosspiece 22, a rear crosspiece 24, and a central spanning member 26. Spanning member 26 is preferably perpendicular to front crosspiece 22 and rear crosspiece 24, which are parallel, and is rigidly affixed thereto by conventional means, such as welding. Each of front and rear crosspieces 22, 24 preferably includes a conventional caster 28 affixed to each end. The casters 28 affixed to front crosspiece 22 are preferably non-pivoting, while the casters 28 affixed to rear crosspiece 24 are preferably pivotable 360° around a vertical axis. It will be understood that the configuration of casters 28 can be modified as desired without departing from the scope of the present invention.

Still referring to FIG. 1, upright support 30 is pivotally mounted on rear crosspiece 24 as described in detail below and includes upper and lower pairs of spool axles 32, 34 respectively. Inclined support 40 is pivotally mounted on front crosspiece 22 at its lower end and releasably attached to the upper end of upright support 30 at its upper end, as more fully described below. Inclined support 40 includes forward and middle pairs of spool axles 42 and 44 respectively. Each spool axle 32a, 32b, 34a, 34b, 42a, 42b, 44a and 44b preferably comprises a pair of rigid tubular members each having one end permanently mounted on the respective support. Alternatively, corresponding pairs of spool axles, such as 32a and 32b, can be made of a single length of tubular material extending through or mounted on the appropriate support member. It will be understood that spool axles 32a, 32b, 34a, 34b, 42a, 42b, 44a and 44b can be made of pipe or other suitable material, so long as they are capable of supporting a spool of cable and functioning as an axle therefore.

Figure 2:
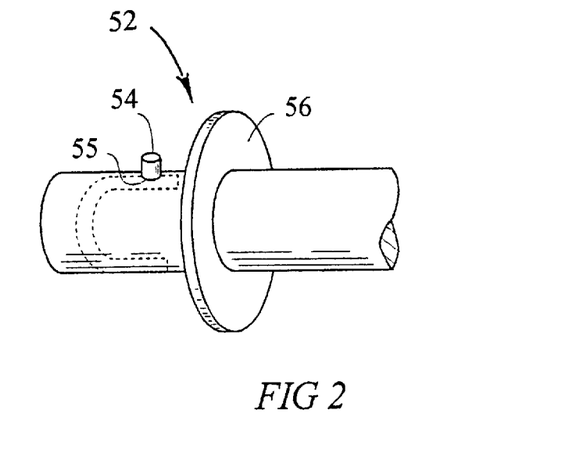
FIG. 2 is an enlarged view of one end of a spool axle according to the present invention.

Each spool axle preferably includes a spool retaining means 52 adjacent its distal end, which functions to prevent the spool from sliding off the end of the axle. Referring briefly to FIG. 2 spool retaining means 52 preferably comprises a spring loaded detent 54 extending through an opening 55 in the wall of the tubular member. Spool retaining means 52 further includes a washer 56 or similar means mounted on the outside of the tube wall so as to be engaged and retained by detent 54. It will be understood that the spool retaining means shown in FIG. 2 is merely one possible means for accomplishing this purpose and other suitable means are contemplated within the scope of the present invention.

Figure 3:
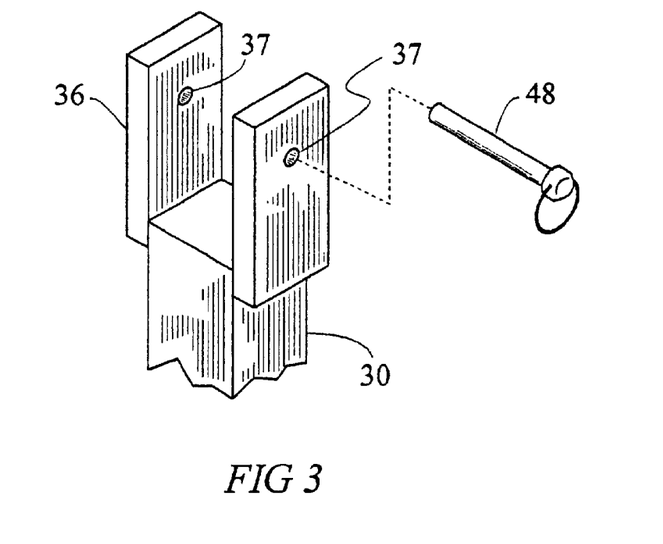
FIGS. 3 and 3A are enlarged views of the upper and lower ends of the vertical support of the dolly shown in FIG. 1.
Figure 3A:
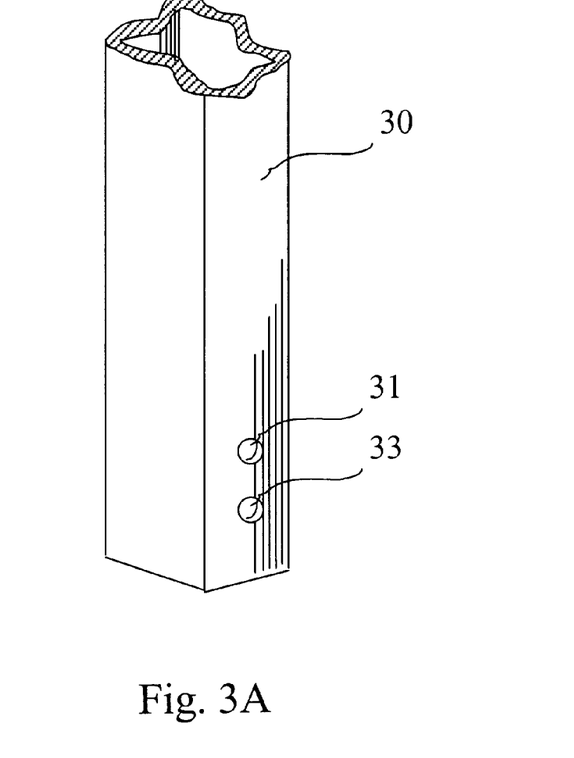
Figure 4:
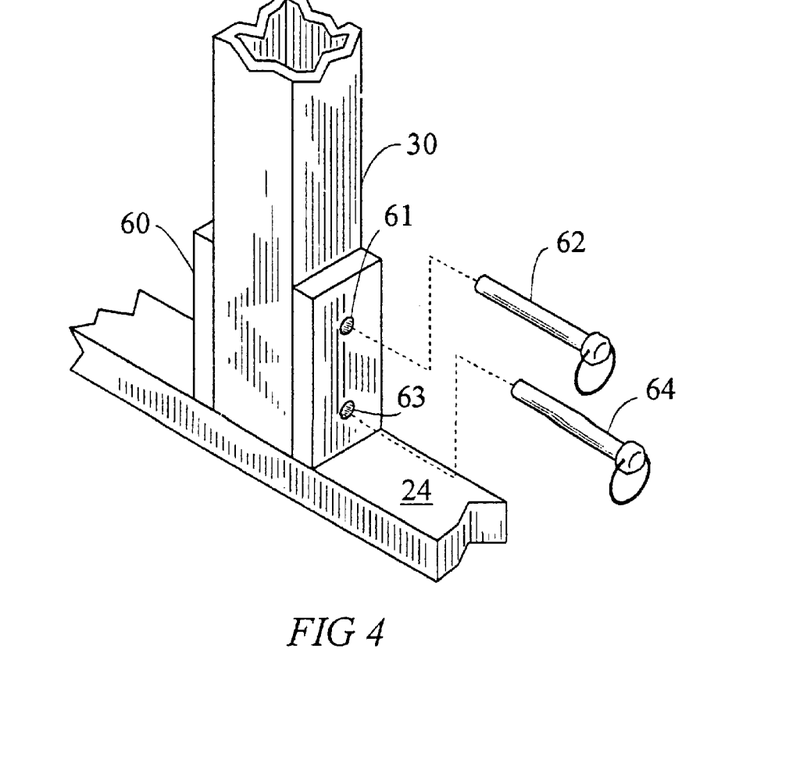
FIG. 4 is an enlarged view of the connection between the lower end of the vertical support and the frame body of the dolly shown in FIG. 1.

Referring now to FIGS. 1, 3 and 4, upright support 30 preferably includes two pairs of aligned holes therethrough 31, 33 (shown in FIG. 3A) at one end and a pair of parallel brackets 36 extending from the opposite end. Brackets 36 include a pair of aligned holes 37 therethrough. The interconnection between upright support 30 and frame 20 comprises a pair of brackets 60 permanently mounted on crosspiece 24. Brackets 60 include upper aligned holes 61 and lower aligned holes 63. Removable pins 62 and 64 extend through upper and lower aligned holes 61, 63 respectively. When upright support 30 is in its upright position as shown in FIG. 1, upright support 30 is received between brackets 60 such that holes 31, 33 align with holes 61, 63 respectively, and pins 62, 64 extend through holes 31, 33. This provides a rigid, non-pivotal connection between upright support 30 and frame 20.

Figure 5:
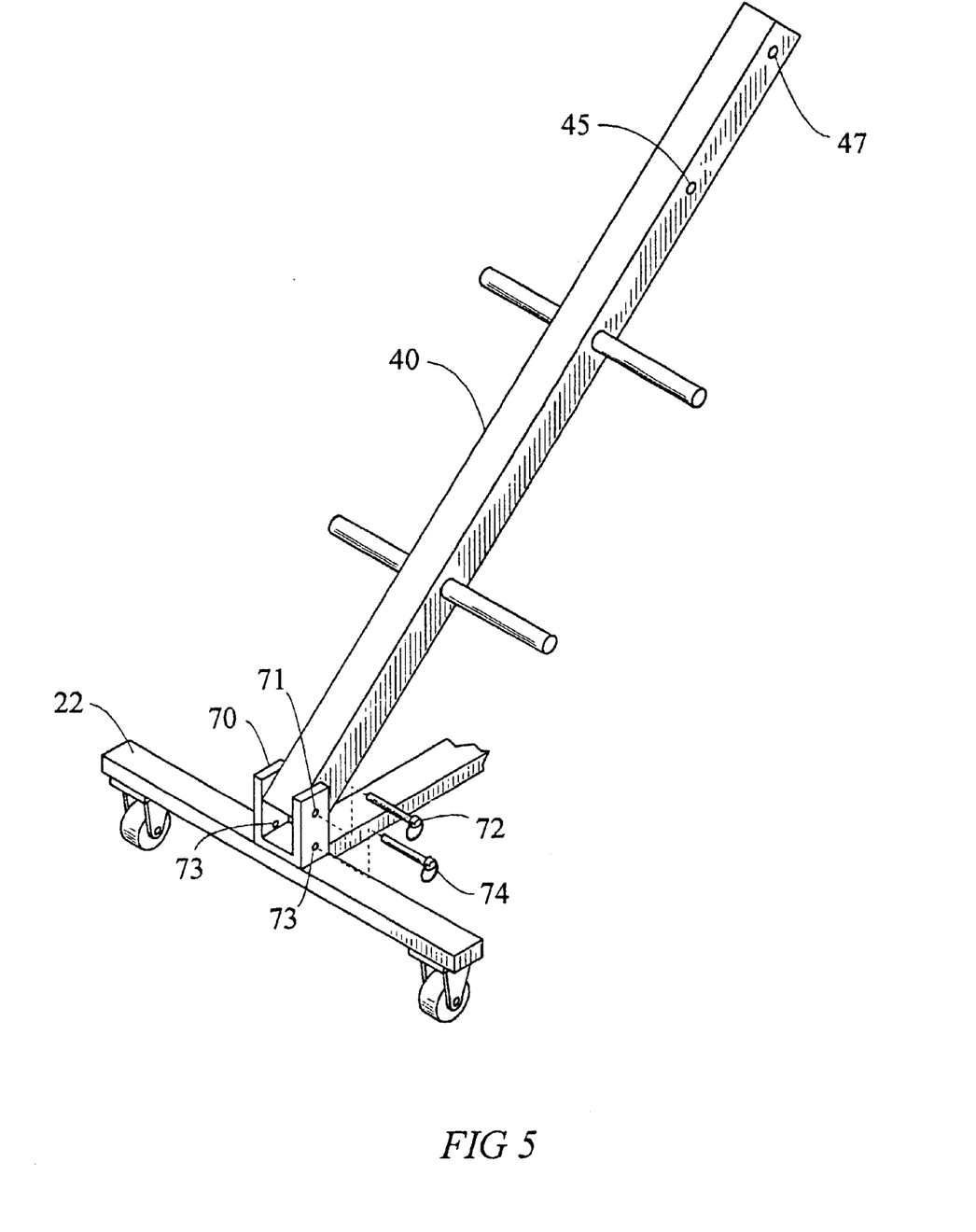
FIG. 5 is an enlarged view of the connection between the lower end of the inclined support and the frame body of the dolly shown in FIG. 1.
Figure 5A:
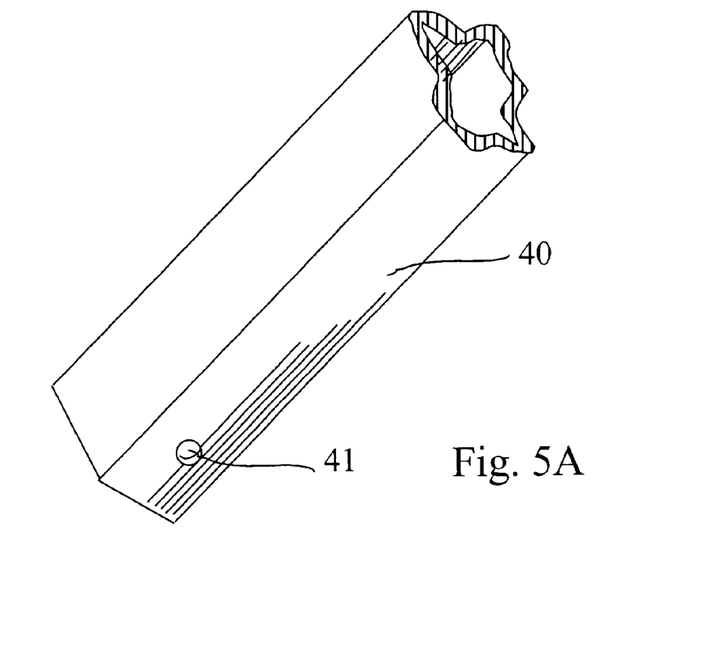
FIG. 5A is an enlarged views of the lower end of the inclined support of the dolly shown in FIG. 1.

Referring now to FIG. 5, inclined support 40 includes a pair of aligned holes 41 therethrough (shown in FIG. 5A) at its first end, a second pair of aligned holes 45 part way along its length, and a third pair of aligned holes 47 at its second end. The interconnection between inclined support 40 and frame 20 comprises a pair of front brackets 70 permanently mounted on frame 20. Brackets 70 include upper aligned holes 71 and lower aligned holes 73. The lower end of inclined support 40 is received between brackets 70 such that holes 41 align with holes 71. When inclined support 40 is in its inclined position as shown in FIG. 1, pin 72 extends through holes 41 and 71 at the lower end of inclined support 40. The upper end of inclined support 40 is attached to the upper end of upright support 30 by aligning holes 47 with holes 37 and inserting a pin 48 therethrough. This provides a rigid, non-pivotal mounting for inclined support 40.

Referring now to FIG. 1, handle 80 preferably includes a U-shaped channel 82 at one end and a cable guide 64 at its opposite end. Cable guide 64 preferable comprises a plate 66 having a plurality of holes 65 therethrough. Holes 65 are preferably lined with a low-friction substance, such as Teflon®, so as to enable the easy passage of sheathed cable therethrough. The side walls 84 of channel 82 include two pairs of aligned holes 81, 83. Handle 80 is mounted on front brackets 70 (FIG. 5) by fitting channel 82 over brackets 70 so that holes 81, 83 align with holes 71, 73 and receive pins 72, 74. In this manner, pins 72, 74 are used to connect handle 80 to frame 20. It will be understood from the foregoing that handle 80 can be connected to frame 20 regardless of whether inclined support 40 is also connected thereto, and vice versa.

Referring now to FIGS. 1–5, the technique for collapsing dolly 10 is as follows. Pin 48 is removed from holes 37 and 47 and pin 62 is removed from holes 31 and 61. Upright support 30 is pivoted around pin 64 counter-clockwise as shown in the drawing until it lies flat on spanning member 26. If preferred, pin 48 may be replaced in holes 37 for storage. Inclined support 40 must be manually supported during this step. Next, inclined support 40 is pivoted about pin 72 clockwise as shown until it lies flat on support 30. Pin 62 is placed through holes 45 and 61 so as to lock support 40 in its folded position. Pin 74 is removed from holes 73, 83 and handle 80 is pivoted about pin 72 in a clockwise direction as shown until it lies flat on collapsed support 40. Pin 74 may be stored in holes 83 if desired. It is preferred but not necessary that the foregoing steps be executed in the order set out above. The procedure for setting up the dolly is the reverse of the steps set out above.

Figure 9:
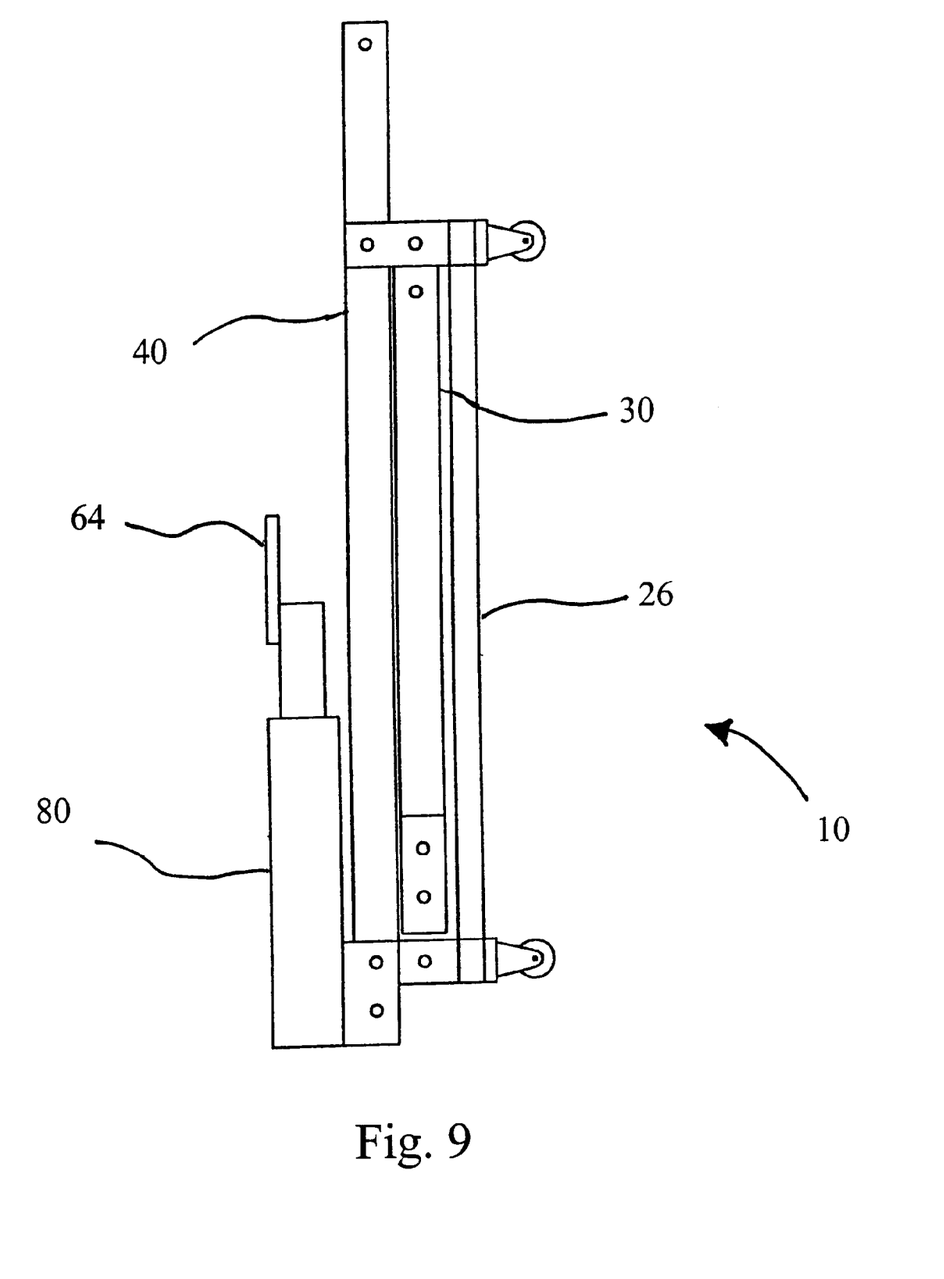
FIG. 9 is a side view of the dolly shown in FIG. 1 in a collapsed state and as rotated into an upright position to rest on its front end.

In its collapsed stated, dolly 10 can be rotated into an upright position (shown in FIG. 9) wherein it rests on its front end. In this upright position, dolly 10 takes up much less floor space than conventional cable dispensing devices and can be handled in a manner similar to conventional dollies and hand trucks, thereby avoiding the need to use a freight elevator when bringing the dolly to the installation site. These features make it much easier to get dolly 10 to the work site.

Referring again to FIGS. 1 and 2, it will be seen that eight cable spools can be removed from the axle. Detent 54 is depressed, allowing removal of washer 56, the spool is placed on the axle, followed by washer 56, and detent 54 is released. The engagement of washer 56 with detent 54 and the spool prevent the spool from slipping off the axle. Cable from each spool is pulled to the front of dolly and threaded through one of the cable guide holes 65 in handle 80. In this manner, cable from one or more spools can be dispensed simultaneously without tangling.

Figure 6:
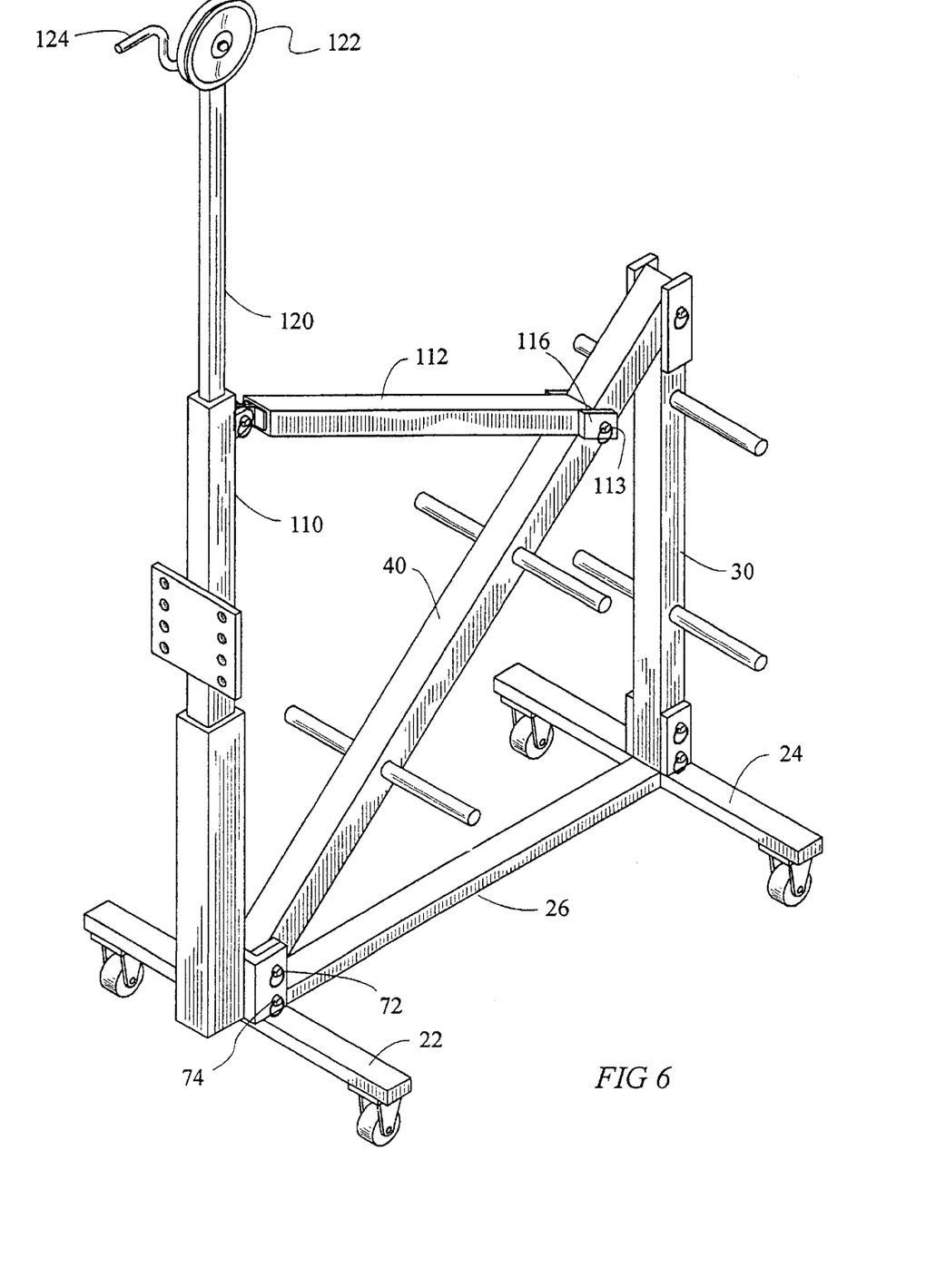
FIG. 6 is a perspective view of the present dolly including an optional elevating cable boom.
Figure 7:
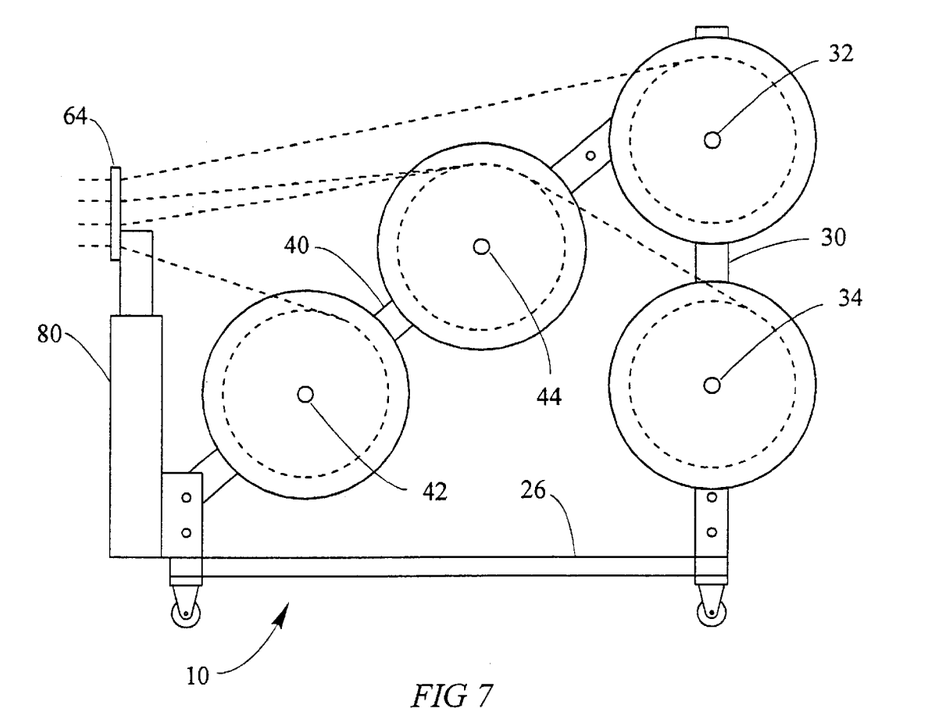
FIG. 7 is a side view of the dolly shown in FIG. 1, showing the cable spools mounted thereon in phantom.
Figure 8:
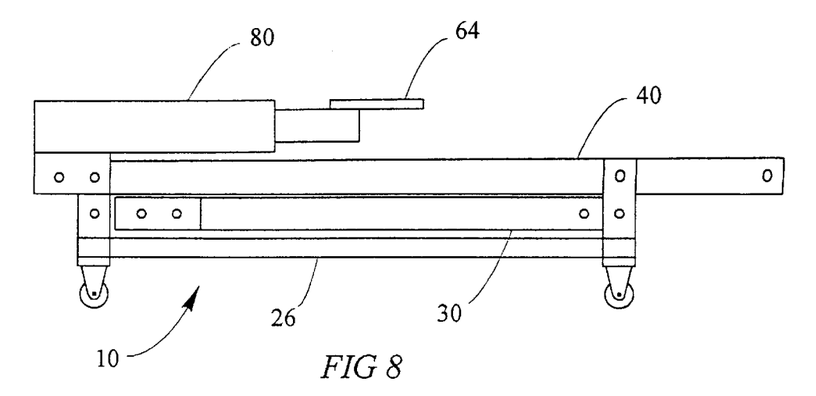
FIG. 8 is a side view of the dolly shown in FIG. 1 in a collapsed state.

Referring now to FIG. 6, when it is desired to provide the cable lines at an elevated level, such as in overhead installations, an additional boom 110 is used in place of handle 80 and cable guide 64. Boom 110 is secured to frame 20 in the same manner as handle 80, namely by the passage of pins 72, 74 through two pairs of aligned holes adjacent its lower end. Boom 110 includes a telescoping section 120 and a support truss 112 pivotally attached thereto at a point 118 well above its lower end. The distal end 114 of truss 112 includes a pair of brackets 116 that include a pair of aligned holes 113. Attachment of boom 110 to cable dolly 10 includes aligning holes 113 with holes 47 in support 40 and placing a pin therethrough. Truss 112 stabilizes boom 110. Boom 110 preferably includes pulley 122 and a hook 124 adjacent its upper end. Hook 124 allows the upper end of boom 110 to be stabilized by engaging ceiling or wireways, while pulley 122 allows cable to be dispensed without violating bend radiuses or snagging on the ceiling opening. Alternative, boom 110 can include a cable guide 118 identical to cable guide 64 adjacent its upper end. According to a preferred embodiment, boom 110 is a telescoping boom, such as are known in the art. This allows cable guide 118 to be positioned at various heights with only minor adjustment to the boom 110.

The present dolly allows the larger 3000 foot spools to be used virtually anywhere and by anyone, whereas previously, the weight and size of the 3000 spools greatly restricted their use. Because larger spools can be used, and because the amount of cable waste that is generated depends solely on the number of spools used and not on spool size, the ability of the present dolly to handle 3000 foot spools results in a significant cost savings. Specifically, the present dolly reduces waste by 60%, as one-third as many spools are needed and the average amount of scrap generated is reduced from 100 feet per 1000 to 100 per 3000. When dolly 10 is loaded with eight 3000 foot spools, it will weigh approximately 800 pounds.

Dolly 10 is preferably constructed out of 1.75" square 14 gage steel tubing having four (4) 1.0"OD/0.75"ID steel tubing axles mounted on the tubing frame. Dolly 10 is mounted on swivel castors at the rear, fixed castors on the front. The folding action of the cable dolly is achieved through a series of pins and hinging. When standing in its operation mode, the cable dolly is preferably 47" tall, 28 inches wide and 4' long. When folded, the cable dolly preferably has a standing height of 10.5". All hardware includes nuts, bolts, pins, washers, and metallic hardware are preferably of galvanized construction. All chassis parts of the cable dolly are heat powder coated. All non-flexible frame parts and bracketry are preferably welded via metal inert gas welding. All flexible and moving parts are preferably either bolted or pinned together. When assembled according to the foregoing, the present cable dolly in unloaded condition weighs approximately 58 pounds. Although the present cable dolly is designed to manage and dispense communications and electrical cabling, the primary use of the present cable dolly will be in the installation of category 5 communications cabling.

While the present cable dolly has been described according to a preferred embodiment, it will be understood that departures can be made from some aspect of the foregoing description without departing from the spirit of the invention. For example, the frame body does not have to be I-shaped, but can be rectangular or have any other suitable shape that provides sufficient rigidity and support. Likewise, the placement and number of spool axles can be varied, as can the dimensions and materials disclosed. Similarly vertical support 30 need not be precisely vertical, but may be inclined in the manner of inclined support 40.

What is claimed is:

1. A dolly for dispensing cable from spools, comprising:
    a frame base having first and second base ends and including a central spanning member extending between said first and second base ends;
    a single substantially vertical support having upper and lower vertical support ends and having said lower vertical support end affixed to said first end of said base; and
    a single inclined support having first and second inclined support ends, said first inclined support end being releasably affixed to said vertical support at a point above said lower vertical support end and said second inclined support end being affixed to said second base end;
    at least one of said vertical support and said inclined support including a cantilevered spool axle for supporting a cable spool and one of said connections between said vertical support and said base and said inclined support and said base being a pivotable connection;
    wherein said vertical support is pivotable in a plane that includes said spanning member.

2. The dolly according to claim 1 wherein said body is I-shaped and includes a front crosspiece, a rear crosspiece and said central spanning member.

3. The dolly according to claim 1 wherein said vertical support is pivotally affixed to said first end of said base.

4. The dolly according to claim 1 wherein said first end of said inclined support is pivotally affixed to said upper end of said vertical support.

5. The dolly according to claim 1 wherein said second end of said inclined support is pivotally affixed to said second end of said base.

6. The dolly according to claim 1 wherein each of said vertical support and said inclined support includes at least one spool axle.

7. The dolly according to claim 1 wherein each of said vertical support and said inclined support includes two spool axles.

8. A dolly for dispensing cable from spools, comprising:
    a frame base having first and second base ends and including a central spanning member extending between said first and second base ends;
    a single substantially vertical support having upper and lower vertical support ends, said lower vertical support end being pivotally affixed to said first base end; and
    a single inclined support having first and second inclined support ends, said first inclined support end being releasably affixed to said vertical support at a point above said lower vertical support end and said second inclined support end being pivotally affixed to said second base end;
    said vertical support being pivotal in a single plane that includes said central spanning member and at least one of said vertical support and said inclined support including a cantilevered spool axle for supporting a cable spool; and
    said dolly being provided with pivotal connections between each of said supports and said base, said pivotal connections being offset from said base such that the dolly is collapsible into a collapsed state by releasing said first inclined support end from said vertical support and pivoting said vertical support and said inclined support at said pivotal connections.

9. The dolly according to claim 8, further including a handle affixed to said second end of said base.

10. The dolly according to claim 9 wherein said handle is releasably affixed to said second end of said base.

11. The dolly according to claim 8 wherein said vertical support and said inclined support lie adjacent to each other and parallel to said base when said dolly is in said collapsed state.

12. A collapsible dolly for dispensing cable from spools, comprising:
    a frame base having first and second base ends and including a central spanning member extending between said first and second base ends:
    a substantially vertical support having upper and lower vertical support, ends said lower vertical support end being releasably pivotally affixed to said first base end; and
    a single inclined support having first and second inclined support ends, said first inclined support end being releasably affixed to said upper vertical support end and said second inclined support end being releasably pivotally affixed to said second base end;
    said vertical support and said inclined support being pivotable in a single plane that includes said spanning member and at least one of said vertical support and said inclined support including a cantilevered spool axle for supporting a cable spool;
    said dolly being capable of collapsing into a collapsed state, the collapsing being effected by pivoting said vertical support and said inclined support.

13. The dolly according to claim 12 wherein said base, said vertical support and said inclined support are constructed such that said dolly is capable of balancing substantially upright on said second base end, said upper vertical support end and said second inclined support end, when in said collapsed state.

14. A collapsible dolly for dispensing cable from spools comprising:
   a frame base having first and second base ends and including a central spanning member extending between said first and second base ends:
   a single substantially vertical support having upper and lower vertical support ends and having said lower vertical support end releasably pivotally affixed to said first base end; and
   a single inclined support having first and second inclined support ends, said first inclined support end being releasably affixed to said upper vertical support end and said second inclined support end being releasably pivotally affixed to said second base end;
   said vertical support and said inclined support being pivotable in a single plane that includes said spanning member and at least one of said vertical support and said inclined support including a cantilevered spool axle for supporting a cable spool.

15. The dolly according to claim 14 wherein said base is I-shaped and includes a front crosspiece, a rear crosspiece and a central spanning member.

16. The dolly according to claim 14 wherein each of said vertical support and said inclined support includes four spool axles.

17. The dolly according to claim 14, further including a handle releasably pivotally affixed to said second end of said body.

18. The dolly according to claim 14 wherein said base lies in a substantially horizontal plane when the dolly is used to support cable reels.

19. The dolly according to claim 14 wherein said body is supported on four casters.

20. The dolly according to claim 14 wherein said dolly is capable of supporting eight 3000 foot spools of cable.

21. A dolly for dispensing cable from spools, comprising:
   a frame base having first and second base ends and including a central spanning member extending between said first and second base ends;
   a single substantially vertical support having upper and lower vertical support ends, said lower vertical support end being pivotally affixed to said first base end;
   a single inclined support having first and second inclined support ends, said first inclined support end being releasably affixed to said vertical support at a point above said lower vertical support end and said second inclined support end being pivotally affixed to said second base end; and
   an elevating cable boom affixed to said second end of said base
   wherein vertical support is pivotal in a single plane that includes said central spanning member;
   wherein and at least one of said vertical support and said inclined support including a cantilevered spool axle for supporting a cable spool; and
   wherein said dolly is provided with pivotal connections between each of said supports and said base, said pivotal connections being offset from said base such that the dolly is collapsible into a collapsed state by releasing said first inclined support end from said vertical support and pivoting said vertical support and said inclined support at said pivotal connections.

22. The dolly according to claim 21 wherein said boom is releasably affixed to said second end of said base.

23. The dolly according to claim 21 wherein said boom is telescoping, has an upper end, and includes a pulley mounted on said upper end.

24. A dolly for dispensing cable from spools, comprising:
   a frame base having first and second base ends and including a central spanning member extending between said first and second base ends;
   a single substantially vertical support having upper and lower vertical support ends, said lower vertical support end being pivotally affixed to said first base end; and
   a single spool support having first and second spool support ends, said first spool support end being releasably affixed to said vertical support at a point above said lower vertical support end and said second spool support end being supported above said second base end;
   at least one of said vertical support and said spool support including a cantilevered spool axle for supporting a cable spool;
   wherein said vertical support and said spool support are pivotable in a single plane that includes said spanning member.

* * * * *